D. GALVIN.
WORK HOLDER.
APPLICATION FILED OCT. 19, 1918.
1,301,424.
Patented Apr. 22, 1919.
2 SHEETS—SHEET 1.
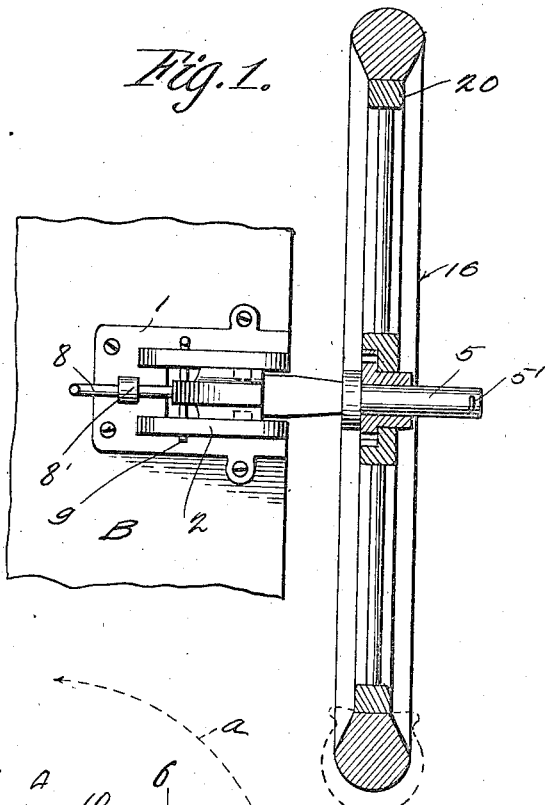
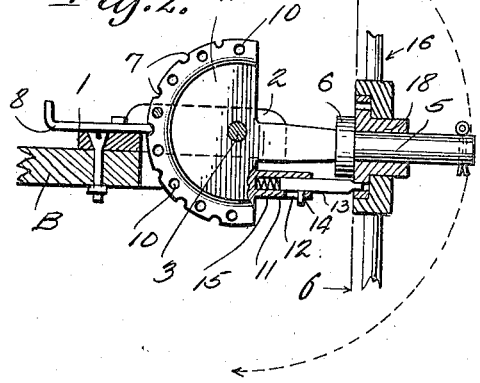
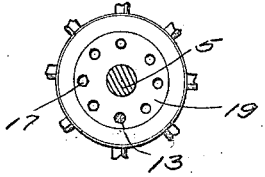
Witnesses
Guy M. Spring
S. M. McColl
Inventor
Dan Galvin
By Richard Bowen
Attorney

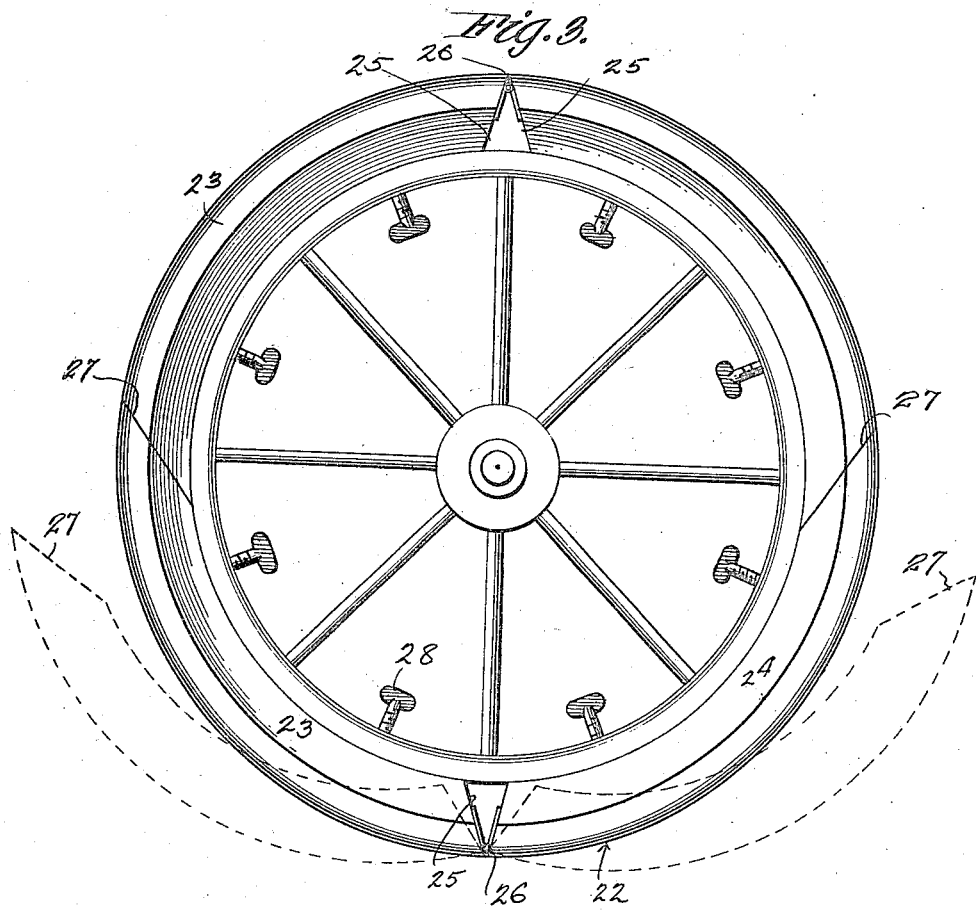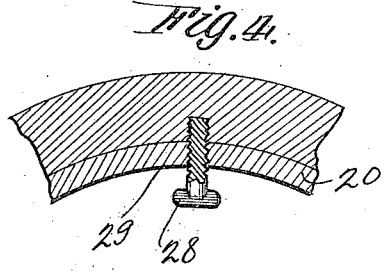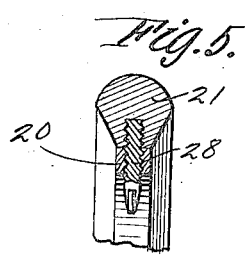

UNITED STATES PATENT OFFICE.

DAN GALVIN, OF PADUCAH, KENTUCKY.

WORK-HOLDER.

1,301,424.　　　　Specification of Letters Patent.　　Patented Apr. 22, 1919.

Application filed October 19, 1918. Serial No. 258,793.

*To all whom it may concern:*

Be it known that I, DAN GALVIN, a citizen of the United States, residing at Paducah, in the county of McCracken and State of Kentucky, have invented certain new and useful Improvements in Work-Holders, of which the following is a specification.

This invention relates to work holders, for vehicle tires to be used in repair shops.

The main object of the invention is to provide a device of this character in which an automobile tire may be placed and positioned to suit the convenience of the workman.

Another object is to provide a device of this character constructed to permit the tire supported thereby to be positioned in planes at right angles to each other and to be held securely in adjusted position.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view partly in horizontal section of the apparatus constituting this invention, Fig. 2 is a detail vertical section thereof, Fig. 3 is a front elevation, Fig. 4 is a detail sectional view through the tire supporting member of the mechanism, Fig. 5 is a transverse sectional view thereof, and Fig. 6 is a detail sectional view taken on the line 6—6 of Fig. 2.

In the embodiment illustrated, the device constituting this invention is shown mounted on a work bench B, being preferably screwed or bolted thereto. The holder constituting this invention comprises an attaching plate 1 having screws for connecting it to the bench B and provided with upstanding laterally spaced plates 2 between which is mounted a semicircular work supporting plate 3, the curved portion or perimeter 4 of which is notched at intervals as shown at 7 and is provided with a plurality of peripherally spaced apertures 10 to receive a pin 9 shown clearly in Figs. 1 and 2 whereby the member 3 is locked in adjusted position. A pin 8 is also mounted in a suitable keeper 8' and is designed to enter one of the notches 7 to assist in holding the member 3 against movement.

The straight edge of this member 3 has a shaft or journal 5 projecting therefrom with a collar 6 fixed thereto at a point spaced inwardly from its free end and which is designed to form a stop or thrust member for a wheel 16 presently to be described. The front straight edge of the member 3 also carries a forwardly projecting tubular member or sleeve 11 having a longitudinal slot 12 for the passage therethrough of a stud 14 carried by the pin 13 mounted to reciprocate in said sleeve. The pin 13 has its outer front end tapered and is designed to enter one of the apertures 17 formed in the hub of the wheel 16 as is shown clearly in Figs. 2 and 6. A coiled spring 15 is mounted in the sleeve 11 behind the pin 13 and exerts its tension to normally project said pin to hold it yieldably in engagement with the wheel.

From the above description it will be obvious that the wheel 16 may be supported on the journal or shaft 5 and as illustrated said wheel has a hub 18 with an annular flange 19 provided with apertures 17, above referred to.

This wheel 16 has a rim 20 on which is mounted a tire engaging surface or member in the form of two substantially semicircular members 21 and 22, each of which is composed of two sections 23 and 24 hingedly connected at one end as shown at 26, said hinged end being beveled inwardly as shown at 25. The free ends of these sections are oppositely beveled as shown at 27 and when the two members 21 and 22 are operatively mounted on the rim their free ends 27 overlap and form a close joint as is shown clearly in Fig. 3.

A plurality of thumb screws 28 are carried by the rim 20 and are designed to engage the tire receiving members 21 and 22, threaded recesses being provided on said members to register with the set screws 28 so that when said screws are turned in one direction, the sections will be projected and when turned in the opposite direction they will be retracted.

In the use of this work holder, the wheel 16 having first been placed on the axle or journal 5, and the cotter pin or other fastening element 5' passed through the shaft to prevent the wheel from slipping off, the tube or shoe to be repaired is placed over the periphery of the wheel and any one of the sections may be expanded as desired by operating one of the thumb screws 28. When the tire has been so placed, the wheel 16 carrying it may be positioned at any angle vertically or peripherally, the peripheral position of the tire relative to the worker being controlled by the pin 13 which is retracted against the tension of the spring 15 through the stud 14, said pin being first withdrawn from the aperture 17 with which it is engaged and the wheel turned on the journal 5 until the portion of the tire to be worked on is properly positioned. The pin is then released and springs into the opposed aperture 17 of the wheel and holds the wheel against further turning. To adjust the wheel along the arc shown at a, the pin 8 is withdrawn from the notch 7 with which it is engaged and the pin 9 is also withdrawn. The wheel may then be swung at the desired angle and these pins again replaced to securely hold it in adjusted position.

From the above description it will be obvious that this tire supporting wheel may be placed at any desired position and is capable of adjustment in planes at right angles to each other so that all parts of the tire may be worked on when necessary.

From the foregoing description, taken in connection with the accompanying drawings, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A work holder of the class described comprising a wheel having a tire supporting surface composed of sections, some of which are hingedly connected, and means for projecting and retracting said sections.

2. A work holder of the class described comprising a wheel having a tire supporting surface composed of sections, some of which are hingedly connected, and set screws carried by said wheel and engaging said sections whereby the sections may be individually projected or retracted at the will of the operator.

3. A work holder of the class described comprising a wheel having a tire supporting surface composed of sections arranged around the periphery thereof and conforming to the shape of the rim, some of said sections being hingedly connected and the free ends of the sections beveled to overlap when assembled to form a close joint, and means for projecting and retracting said sections.

In testimony whereof I affix my signature in presence of two witnesses.

DAN GALVIN.

Witnesses:
 MURTEL WALKER,
 WINNIE BAZZELL.

Copies of this patent may be obtained for five cents each, by addressing the "Commissioner of Patents, Washington, D. C."